M. Keefer,
Vegetable Cutter.
No. 93,312. Patented Aug. 3, 1869.

United States Patent Office.

MICHAEL KEEFER, OF WASHINGTON COUNTY, MARYLAND.

Letters Patent No. 93,312, dated August 3, 1869.

IMPROVEMENT IN SLAW-CUTTERS.

The Schedule referred to in these Letters Patent and making part of the same.

*To all whom it may concern:*

Be it known that I, MICHAEL KEEFER, of Washington county, State of Maryland, have invented a new and valuable Improvement in Slaw-Cutting Machines; and I do hereby declare that the following is a full, clear, and exact description of the construction and operation of the same, reference being had to the annexed drawings, making a part of this specification, and to the letters and figures of reference marked thereon.

Figure 1:
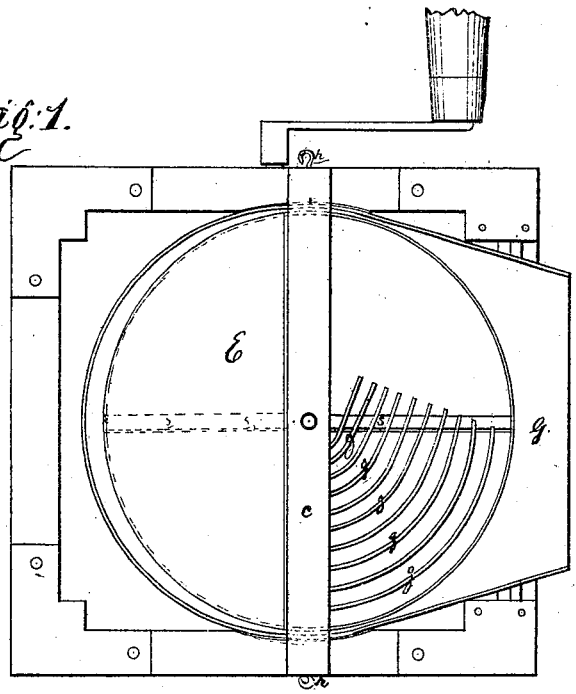

Figure 1 of the drawings is a top plan view of my invention.

Figure 2:
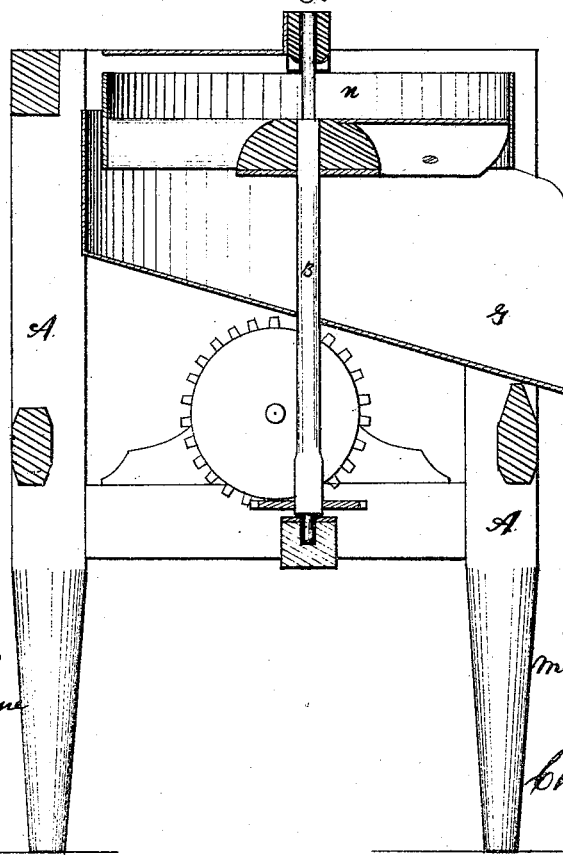

Figure 2 is a side longitudinal sectional view of the same.

My invention relates to devices for preparing cabbages for sour krout, slaw, and the like; and It consists mainly in a novel arrangement of devices by which cabbages may be readily and efficiently cut into small fragments.

The letter A of the drawings represents a frame, upon the lower bars of which I arrange a crank and shaft, and a pinion-wheel, arranged to work with a pinion upon the lower end of the perpendicular shaft hereinafter mentioned.

The letter B represents a vertical shaft, pivoted at its bottom upon a central cross-bar of the frame, as shown, and at its upper end to a cross-bar extending across the top of the frame. This last-mentioned bar is marked c on the drawings, and it is adjusted upon the frame by means of pins h, in the manner represented. By means of these pins, the bar c is made removable at will.

The letter E is a rotating wheel, firmly affixed to the shaft B, and surrounded by a plate, n, the upper portion of which rises above the surface of the wheel E proper, and forms therewith a convenient dish for holding the cabbage to be cut.

The letters s represent planes or knives, arranged in the bottom of wheel E, as shown, intended for use in cutting cabbage. Any proper number of these knives may be arranged in this wheel.

The letters g represent a series of wires affixed to a flanch upon the bar c, that extends downward to a point near the surface of wheel E on one side of the main shaft only. These wires are bent upward at their outer ends, thereby forming a species of basket, in which the cabbage is held while being cut.

The letter G represents a chute or apron, that receives the cabbage after it is cut, and conducts it downward to any receptacle that may be placed at its mouth.

By making the bar c removable, I am enabled to remove the wheel E at will, for cleaning or other purposes.

To operate my device, I place the cabbage in the basin formed by the wheel E and its rim, and turn the crank of the machine.

What I claim as my invention, and desire to secure by Letters Patent, is—

A machine for cutting cabbages, having crank and pinion-gearing as described, shaft B, wheel E, knives s, removable bar c, bent wires g, and chute G, constructed and arranged to operate substantially as specified.

In testimony that I claim the above, I have hereunto subscribed my name, in the presence of two witnesses.

MICHAEL X KEEFER.
his mark.

Witnesses:
  DENNIS CAIN,
  ANDREW C. HARTMAN.